US012636847B2

(12) United States Patent
Huang

(10) Patent No.: US 12,636,847 B2
(45) Date of Patent: May 26, 2026

(54) INTELLIGENT CARTON BLANK ERECTING

(71) Applicant: Shanghai Soontrue Machinery Equipment Co., Ltd., Shanghai (CN)

(72) Inventor: Song Huang, Shanghai (CN)

(73) Assignee: Shanghai Soontrue Machinery Equipment Co., Ltd., Shanghai (CN)

( * ) Notice: Subject to any disclaimer, the term of this patent is extended or adjusted under 35 U.S.C. 154(b) by 0 days.

(21) Appl. No.: 19/018,670

(22) Filed: Jan. 13, 2025

(65) Prior Publication Data

US 2025/0353271 A1 Nov. 20, 2025

(30) Foreign Application Priority Data

May 20, 2024 (CN) ........................ 202410625116.8

(51) Int. Cl.
*B31B 50/07* (2017.01)
*B31B 50/00* (2017.01)
*B31B 50/26* (2017.01)

(52) U.S. Cl.
CPC ............ *B31B 50/07* (2017.08); *B31B 50/006* (2017.08); *B31B 50/26* (2017.08)

(58) Field of Classification Search
CPC ..... B31B 50/003; B31B 50/07; B31B 50/006; B31B 50/80; B31B 50/26; B31B 2120/302
See application file for complete search history.

(56) References Cited

U.S. PATENT DOCUMENTS

| | | | | | |
|---|---|---|---|---|---|
| 3,952,636 | A * | 4/1976 | Reichert | B65B 43/185 | 493/207 |
| 4,998,910 | A * | 3/1991 | Mohaupt | B31B 50/00 | 493/15 |
| 5,156,582 | A * | 10/1992 | Thompson | B31B 50/262 | 493/123 |
| 6,764,436 | B1 * | 7/2004 | Mazurek | B31B 50/804 | 493/122 |
| 7,510,517 | B2 * | 3/2009 | Goodman | B31B 50/804 | 493/317 |
| 9,027,315 | B2 * | 5/2015 | Tsutsumi | B65B 43/305 | 53/381.1 |
| 11,731,386 | B2 * | 8/2023 | Kolodziey | B31B 50/262 | 493/162 |
| 11,780,197 | B2 * | 10/2023 | Johnson | B31B 50/046 | 493/132 |
| 12,441,075 | B2 * | 10/2025 | Lai | B31B 50/52 | |

(Continued)

*Primary Examiner* — Thomas M Wittenschlaeger
(74) *Attorney, Agent, or Firm* — Fish & Richardson P.C.

(57) ABSTRACT

Examples of carton blank erecting intelligent systems and example methods for erecting carbon blanks are described. In one example, the carton blank erecting intelligent system includes a control device and an actuating device. The actuating device includes an actuating mechanism, a movable sucker group, and a fixed sucker group. The control device controls the actuating mechanism to drive the movable sucker group to suck carton body I to move a carton blank from a carton blank storage station to a carton blank erecting station. The fixed sucker group in the carton blank erecting station sucks carton body II, and keeps the carton body II stationary. The actuating mechanism drives the movable sucker group to suck the carton body I to move along a curved trajectory relative to the carton body II. After the carton body I is moved to a predetermined position, the carton blank is erected.

20 Claims, 6 Drawing Sheets

(56) References Cited

U.S. PATENT DOCUMENTS

| | | | | |
|---|---|---|---|---|
| 2004/0168408 | A1* | 9/2004 | Spatafora | B65B 43/305 53/566 |
| 2007/0197364 | A1* | 8/2007 | Monti | B65H 3/0883 493/316 |
| 2007/0293383 | A1* | 12/2007 | Gebhardt | B31B 50/78 493/313 |
| 2008/0113856 | A1* | 5/2008 | Chen | B65B 43/265 493/313 |
| 2010/0204030 | A1* | 8/2010 | Pazdernik | B31B 50/07 493/317 |
| 2018/0126683 | A1* | 5/2018 | Johnson | B31B 50/046 |
| 2022/0134700 | A1* | 5/2022 | Kolodziey | B31B 50/80 493/162 |
| 2024/0083131 | A1* | 3/2024 | Lam | B31B 50/066 |
| 2025/0353270 | A1 | 11/2025 | Huang | |

* cited by examiner

INTELLIGENT CARTON BLANK ERECTING

CROSS-REFERENCE TO RELATED APPLICATIONS

This application claims priority to Chinese Patent Application No. 202410625116.8, filed on May 20, 2024, which is hereby incorporated by reference in its entirety.

TECHNICAL FIELD

This application relates to the field of packaging system technologies, in particular, to the field of carton-type packaging system technologies, and more specifically, to a carton blank erecting intelligent system.

BACKGROUND

During packaging using an automated carton packaging apparatus, folded carton blanks have to be erected, and an automated erecting mechanism is usually used to automatically erect carton blanks.

Currently, carton blank erecting apparatuses include vertical erectors and horizontal erectors. A vertical erector is used to erect folded carton blanks that are vertically placed, with openings of erected cartons facing upward; while a horizontal erector is used to erect folded carton blanks in a lay-flat posture, with openings of erected cartons perpendicular to the vertical direction.

Based on the stacking method of carton blanks, erecting is classified into forward erecting and reverse erecting. A carton erected from a carton blank includes four carton body sides, i.e., a front side (carton body I), a back side (carton body II), a left side (carton body III), and a right side (carton body IV). A process of erecting a carton blank that is folded with the left side and front side on the same plane is defined as forward erecting, and a process of erecting a carton blank that is folded with the front side and right side on the same plane is defined as reverse erecting. In existing technologies, different erecting systems are used to implement forward erecting and reverse erecting. A reverse erecting system is generated by mirroring forward erecting, that is, two erecting systems are needed to adapt to forward erecting and reverse erecting, respectively, and one erecting system cannot implement both forward erecting and reverse erecting.

Existing carton blank erecting systems are as follows (the following carton blank erecting systems are described by taking forward erecting as an example).

A first carton blank erecting system uses an actuating mechanism to drive a movable sucker group to suck carton body I of a carton blank to fetch the carbon blank. In the process of fetching the carbon blank, an auxiliary forming strip is used to press against carton body III, so that carton body III rotates by 90° about a joint between carton body III and carton body I, and the carton blank is erected. Such a carton blank erecting system relies on a pulling force of the actuating mechanism and the press of the auxiliary forming strip to complete the erection of the carton blank in the process of fetching the carton blank.

A second carton blank erecting system uses an actuating mechanism to drive a movable sucker group and a turnover-plate sucker group to suck carton body I and carton body III of a carton blank to fetch the carbon blank. In the process of fetching the carbon blank or after the fetched carbon blank is moved in place, the turnover-plate sucker group is driven to rotate by 90° about a hinged shaft for hinging the turnover-plate sucker group with the movable sucker group, so that carton body III rotates by 90° about a joint between carton body III and carton body I, and the carton blank is erected. Such a carton blank erecting system relies on a push force generated by rotation of the turnover-plate sucker group to push carton body III to rotate. The turnover-plate sucker group can be operated during the process of fetching the carbon blank or after the fetched carbon blank is in place. The principle of this system is the same as the principle of the first carton blank erecting system mentioned above.

Both the carton blank erecting systems achieve the erection of the carton blank by rotating carton body III by 90° relative to carton body I. During the erection of the carton blank, carton body II and carton body IV of the carton blank have no support, and carton body II and carton body IV rotate along with the turnover of carton body III. As a result, carton body II and carton body IV are under great stress, and thus pose high requirements on the hardness of the carton blank. When the hardness of the carton blank is low, carton body II and carton body IV are extremely prone to being stressed and deformed, resulting in a poor carton blank erecting effect, a low effective erecting success rate, and low erecting efficiency.

A third carton blank erecting system uses two actuating mechanisms, which move along the X-axis direction and the Y-axis direction, respectively. The actuating mechanism moving along the X-axis direction sucks carton body I of a carton blank to fetch the carbon blank. After the fetched carbon blank is moved in place, carton body II of the carton blank is sucked and secured by the actuating mechanism moving along the Y-axis direction. After the two actuating mechanisms move along the X-axis direction and the Y-axis direction, respectively, and carton body I and carton body II are gradually separated and moved in place, the carton blank is erected.

The third carton blank erecting system mentioned above uses two actuating mechanisms to control carton body I and carton body II to move in a staggered way so as to erect the carton blank. This system has at least the following defects.

(1) Coordination of the two actuating mechanisms is needed, which increases apparatus costs.

(2) When carton body I and carton body II of the carton blank move in a staggered way, coordination between the two action mechanisms needs to be controlled, that is, the moving speed of carton body I and the moving speed of carton body II need to be controlled. At present, commonly-used cartons are rectangular. Although a displacement of carton body I moving in a direction parallel to carton body I is the same as a displacement of carton body II moving in a direction perpendicular to carton body I, the speeds of carton body I and carton body II must not be the same, and need to be changing. Consequently, a control method for controlling linkage of the two action mechanisms is complex. Once the speeds of the two actuating mechanisms do not adapt to each other, the carton blank will be deformed, resulting in a poor carton blank erecting effect, and even a carton blank erecting failure.

(3) Both carton body I and carton body II of the carton blank need to be moved. Therefore, in the process of erecting the carton blank, there is no fixed reference and the reference of this process is changing. Consequently, it is difficult to erect the carton blank, and the carton blank erecting efficiency is reduced.

(4) After the carton blank is erected, carton boards at an opening on one side of the erected carton blank need to be folded. In the above-mentioned first and second carton blank erecting methods, the carton blank is finally erected at a relatively fixed position, carton boards at an opening on one side of the carton blank are folded at a carton blank erecting station, and a carton board folding mechanism has a relatively fixed position. When the size of the carton blank is changed, the reference for the carton blank erecting station remains unchanged, and the position does not change greatly. In this case, the carton board folding mechanism can be matched simply through adaptive adjustment. However, in the third method, because carton body I and carton body II of the carton blank move relative to each other, after the size of the carton blank is changed, an erecting reference position of the carton blank also changes. Consequently, corresponding adjustment of the position of the carton board folding mechanism is difficult and time-consuming.

A fourth carton blank erecting system uses two actuating mechanisms. One is used to perform a carton blank fetching action, and the other is used to perform an erecting action. The actuating mechanism that performs the carton blank fetching action sucks carton body I of a carton blank to fetch the carbon blank, and the actuating mechanism remains stationary after the fetched carbon blank is moved in place, so that carton body I of the carton blank is relatively fixed. Then, the actuating mechanism that performs the erecting action is started, moves to carton body II of the carton blank whose carton body I is relatively fixed, and sucks carton body II. The actuating mechanism that performs the erecting action drives carton body II to move in a curve-fitting way in both a direction perpendicular to carton body I and a direction parallel to carton body I, and the carton blank is erected after carton body II is moved in place.

Both the third carton blank erecting system and the fourth carton blank erecting system mentioned above use two action mechanisms to achieve carton blank fetching and erecting actions, and costs of carton blank erecting apparatuses are high. Especially in the third carton blank erecting system, the actuating mechanism that performs the carton blank fetching action further needs to coordinate with the actuating mechanism that performs the erecting action to achieve erection. A high requirement is posed on coordination precision between the two actuating mechanisms, and high-speed erection cannot be achieved, resulting in a low effective erecting success rate and low erecting efficiency. In the fourth carton blank erecting system, only after the fetched carbon blank is in place, the actuating mechanisms can perform actions to suck carton body II of the carton blank to drive carton body II of the carton blank to move. The carton blank fetching and erecting actions are incoherent, and there is an interval in between, resulting in low erecting efficiency.

SUMMARY

To reduce the above-mentioned defects and deficiencies in the existing technologies, this application provides a carton blank erecting intelligent system. An objective of this application is to resolve the problems of high costs, high control precision requirements, complex coordination, and low erecting efficiency caused by action intervals resulting from incoherence between carton blank fetching and erecting actions of the carton blank erecting systems in the existing technologies. The intelligent system of this application includes a control unit and an actuating unit, and the control unit controls the actuating unit to complete carton blank fetching and erecting operations; the actuating unit includes an actuating mechanism, a movable sucker group mounted at a moving end of the actuating mechanism, and a fixed sucker group disposed at a carton blank erecting station; the control unit controls the actuating mechanism to drive the movable sucker group to move to a carton blank storage station and secure and suck a carton blank in the carton blank storage station, the actuating mechanism drives the movable sucker group to suck carton body I to move the carton blank from the carton blank storage station to the carton blank erecting station; the fixed sucker group in the carton blank erecting station sucks carton body II, and keeps carton body II stationary, the actuating mechanism drives the movable sucker group to suck carton body I to move along a curved trajectory relative to carton body II, and after carton body I is moved in place, the carton blank is erected. The carton blank erecting intelligent system of this application uses one actuating mechanism to achieve a carton blank fetching action and erecting action, and uses carton body I as a reference for both carton blank fetching and erecting. As such, the carton blank fetching and erecting actions can be coherent with no motion interval between the two actions. Such practice improves an effective erecting success rate, and only needs to control motions of carton body I, thereby enabling easier control and implementation.

To reduce the above-mentioned problems in the existing technologies, this application is implemented by using the following technical solutions.

This application provides a carton blank erecting intelligent system. The intelligent system includes a control unit and an actuating unit, and the control unit controls the actuating unit to complete carton blank fetching and erecting actions; the actuating unit includes an actuating mechanism, a movable sucker group mounted at a moving end of the actuating mechanism, and a fixed sucker group disposed at a carton blank erecting station; the control unit controls the actuating mechanism to drive the movable sucker group to move to a carton blank storage station and secure and suck a carton blank in the carton blank storage station, and the actuating mechanism drives the movable sucker group to suck carton body I to move the carton blank from the carton blank storage station to the carton blank erecting station; the control unit controls the fixed sucker group in the carton blank erecting station, sucks carton body II of the carton blank that is moved in place, and secures and keeps carton body II at the carton blank erecting station; after carton body II is secured and sucked by the fixed sucker group, the actuating mechanism drives carton body I sucked by the movable sucker group to move along a curved trajectory relative to carton body II, and after carton body I is moved in place, the carton blank is erected; where carton body I and carton body II are carton bodies on opposite sides of the erected carton blank; in a process of driving carton body I to move along the curved trajectory relative to carton body II, carton body II is always stationary, and carton body I is always parallel to carton body II; and the curved trajectory shows that a projection of carton body I on a first plane gradually moves away from a projection of carton body II on the first plane, and a projection of carton body I on a second plane gradually coincides with a projection of carton body II on the second plane, where the first plane is a plane perpendicular to carton body I and carton body II, and the second plane is a plane parallel to carton body I and carton body II.

Further preferably, the control unit adjusts a position of the fixed sucker group relative to the carton blank erecting station based on the size of the carton blank, and performs fitting calculation to obtain the curved trajectory followed by the actuating mechanism in driving carton body I sucked by the movable sucker group.

Furthermore preferably, the control unit controls, based on a stacking posture of the carton blank, a direction followed by the actuating mechanism in driving carton body I sucked by the movable sucker group to move along the curved trajectory so as to achieve forward erecting or reverse erecting.

Furthermore preferably, the forward erecting means the following: with a conveying direction of the erected carton blank as a reference, when carton body II of the carton blank in a folded state is located at a rear end of carton body I, the actuating mechanism drives the movable sucker group to drive carton body I to move backward along the curved trajectory.

Furthermore preferably, the reverse erecting means the following: with a conveying direction of the erected carton blank as a reference, when carton body II of the carton blank in a folded state is located at a front end of carton body I, the actuating mechanism drives the movable sucker group to drive carton body I to move forward along the curved trajectory.

Further preferably, the curved trajectory is a ¼ arc trajectory that uses the length of carton body III or carton body IV adjacent to carton body II as the radius and the center of a joint between carton body II and carton body III or carton body IV adjacent to carton body II as the center of a circle.

Further preferably, the carton blank erecting station is located at a front end of an erected carton blank conveying path, the control unit controls the movable sucker group and the fixed sucker group to release carton body I and carton body II, and the erected carton blank is conveyed backward along the erected carton blank conveying path.

Furthermore preferably, the center line of the carton blank coincides with the center line of the erected carton blank conveying path after the carton blank is erected.

Further preferably, after the carton blank is erected at the carton blank erecting station, the control unit controls a carton board folding mechanism to fold carton boards at an opening at one end of the erected carton blank to seal the opening.

Further preferably, after the actuating mechanism drives the movable sucker group to suck carton body I to move the carton blank from the carton blank storage station to the carton blank erecting station, the control unit controls the fixed sucker group to reach out towards a direction of carton body II, and suckers of the fixed sucker group come into contact with carton body II to secure carton body II by vacuum negative-pressure suction; and after the carton blank is erected, the fixed sucker group releases suction on carton body II and then is reset.

Further preferably, when a cross section of the erected carton blank is rectangular, carton body I and carton body II are long-side carton bodies of the carton blank.

Further preferably, the actuating mechanism is a two-axis parallel manipulator or a serial manipulator.

Further preferably, the actuating mechanism is an XY-axis work module or a cross slide work module.

Compared with the existing technologies, the beneficial technical effects brought about by this application are as follows.

1. Compared with the first and second carton blank erecting systems illustrated in the background, the carton blank erecting intelligent system of this application performs the carton blank fetching action and erecting action individually, the carton blank fetching action and erecting action are implemented by one actuating mechanism, and the erecting action is different in that the system implements erecting of the carton blank through staggered separation between carton body I and carton body II. During the erecting, carton body III and carton body IV are not subject to a press force, and thus are not deformed. If carton body III and carton body IV of the carton blank are originally deformed, carton body III and carton body IV can also be straightened through staggered separation between carton body I and carton body II to correct the deformation.
2. Compared with the third carton blank erecting system illustrated in the background, in the carton blank erecting intelligent system of this application, carton body II is stationary when the erecting action is performed, and only an action of carton body I needs to be controlled. The action of carton body I is easier to control, simpler to control, and faster to implement, and does not need two actuating mechanisms. Therefore, costs of an implementation apparatus for the intelligent system are low. That is, compared with the existing third carton blank erecting system, the intelligent system of this application features easy and simple implementation and control, higher erecting efficiency, and lower costs of implementation apparatuses.
3. Compared with the third carton blank erecting system illustrated in the background, in the carton blank erecting intelligent system of this application, a position for erecting a carton blank is based on a reference, and the reference remains unchanged regardless of the size and specifications of the carton blank. In the third method, carton body I and carton body II move relative to each other, and a position of reference is changing based on carton blanks with different sizes and specifications. If the position of reference is changed, positions of the carton board folding mechanism and other mechanisms after erecting need to be adjusted, and the adjustment is relatively difficult. Because the reference in this application remains unchanged, positions of the carton board folding mechanism and other mechanisms do not need to be adjusted, thereby facilitating implementation and layout of a structure.
4. Compared with the fourth carton blank erecting system illustrated in the background, in the carton blank erecting intelligent system of this application, carton body I is always driven by the actuating mechanism to perform actions, and one actuating mechanism is used from the fetching to the erecting of a carton blank. Therefore, the actions of the carton blank are simpler, and the carton blank fetching action and erecting action can be implemented more simply and coherently, with no action interval between the carton blank fetching action and erecting action. The erecting action is performed immediately after the carton blank fetching action, without waiting for a related mechanism to execute to position or a waiting interval. Thus, the method of this application features higher erecting efficiency.
5. The carton blank erecting intelligent system of this application is widely applied and is not affected by materials of carton blanks. For carton blanks subject to soft materials, thin carton bodies, impact from humidity, and reuse, the carton blank erecting intelligent system of this application can achieve effective erection, and ensure effective success erecting rates for these carton blanks.

6. The carton blank erecting intelligent system of this application can adjust the position of the fixed sucker assembly relative to the erecting station based on the size of the carton blank, and performs fitting calculation to obtain the curved trajectory followed by the actuating mechanism in driving carton body I sucked by the movable sucker group, so as to achieve customized menu-based control on the size of the carton blank, and also achieve input control on the size of the carton blank, thereby achieving intelligent adaptation to different sizes of carton blanks.
7. The carton blank erecting intelligent system of this application is not affected by a stacking state of carton blanks, and is applicable to forward erecting and reverse erecting. Switching between forward erecting and reverse erecting only leads to a difference in the moving direction of carton body I relative to carton body II, and an implementation structure does not need to be changed. One-click switching between forward erecting and reverse erecting can be achieved simply by performing corresponding selection and switching on a control program of the intelligent system.
8. In the carton blank erecting intelligent system of this application, the motion trajectory followed by the actuating mechanism in driving carton body I can be approximately a ¼ arc trajectory that uses the length of carton body III or carton body IV adjacent to carton body II as the radius and the center of a joint between carton body II and carton body III or carton body IV adjacent to carton body II as the center of a circle. It is easy to implement the motion trajectory of carton body I, thereby further simplifying a control program for controlling operation of carton body I, reducing a manufacturing precision requirement on the carton blanks, and allowing the carton blanks to have a specified manufacturing error.
9. In the carton blank erecting intelligent system of this application, the carton blank erecting station is located at the front end of the erected carton blank conveying path, and thus the carton blank can be conveyed to the next procedure immediately after being erected. As such, an implementation structure is compact and actions are coherent, thereby reducing an action interval between erecting of the carton blank and conveying of the carton blank, and further effectively improving carton blank erecting and conveying efficiency. In particular, the center line of the carton blank coincides with the center line of the erected carton blank conveying path after the carton blank is erected, thereby ensuring centering of the carton blank after being erected, reducing deflection when conveying the carton blank after the carton blank is erected, and further improving carton blank erecting and conveying efficiency.
10. In this application, the fixed sucker group is used to secure carton body II, the implementation structure of the fixed sucker group is simple, and control instructions of the control unit can be implemented easily. The control unit only needs to control suction and release of the fixed sucker group, an action response is sensitive and easy to implement, a good securing effect can be achieved, and a displacement of carton body II in any direction in space can be implemented, thereby ensuring that carton body II can be effectively secured during erecting of the carton blank. When carton body III and/or carton body IV need/needs to be straightened and corrected, the fixed sucker group can coordinate with the movable sucker group that pulls carton body I to stretch and correct carton body III and/or carton body IV. The motion trajectory of carton body I can also be varied in response to erecting of the carton blank in different cases.
11. In this application, a long-side carton body is preferably selected as a reference carton body for erecting the carton blank to ensure stability, high efficiency, and a high success rate in erecting the carton blank.

DESCRIPTION OF EMBODIMENTS

Figure 1:
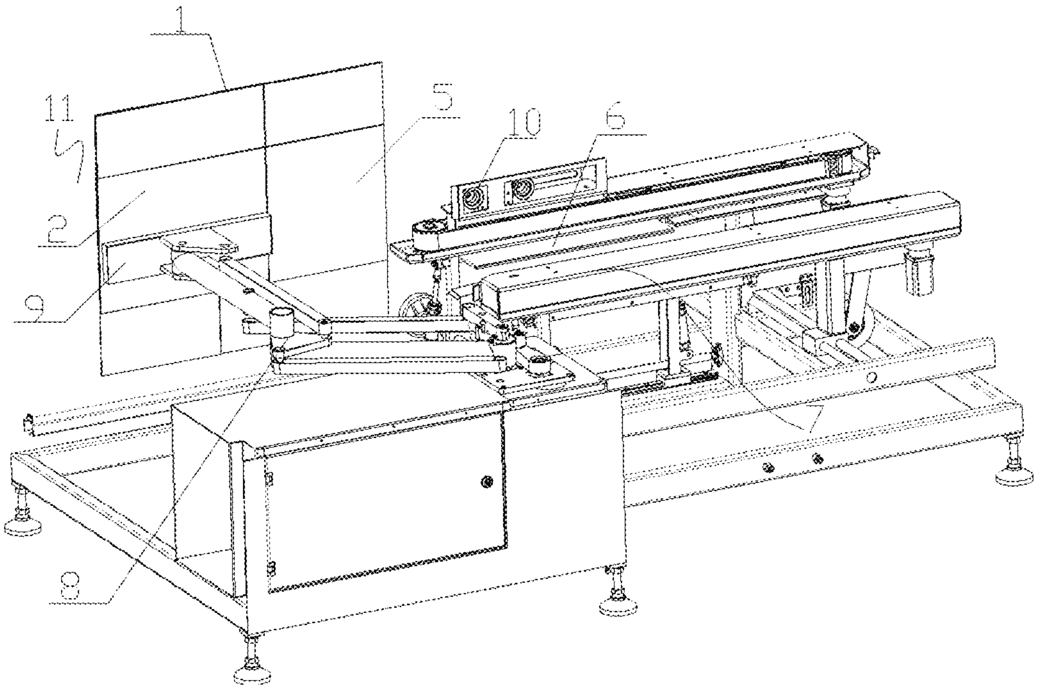
FIG. 1 is a perspective view illustrating an implementation structure of a carton blank erecting intelligent system of this application.
Figure 2:
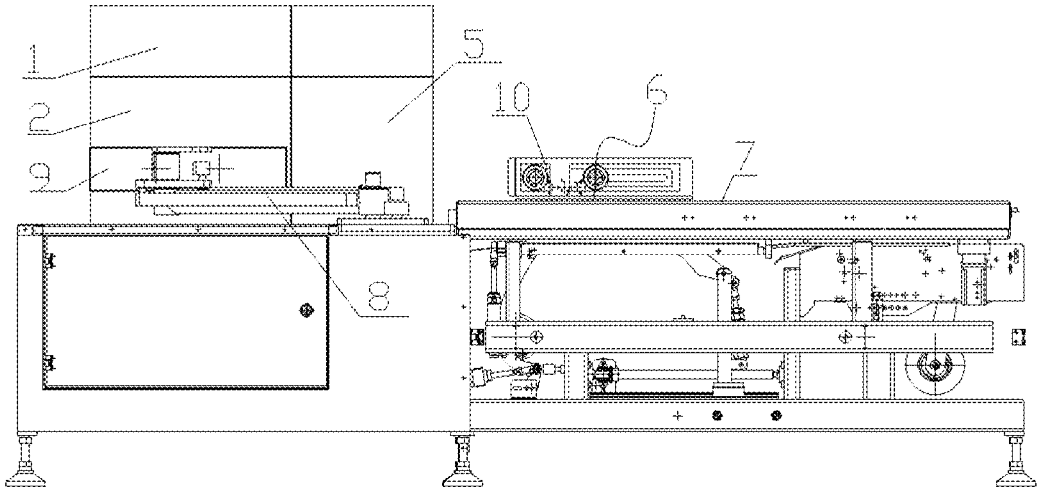
FIG. 2 is a schematic structural front view illustrating the implementation structure shown in FIG. 1 of this application.
Figure 3:
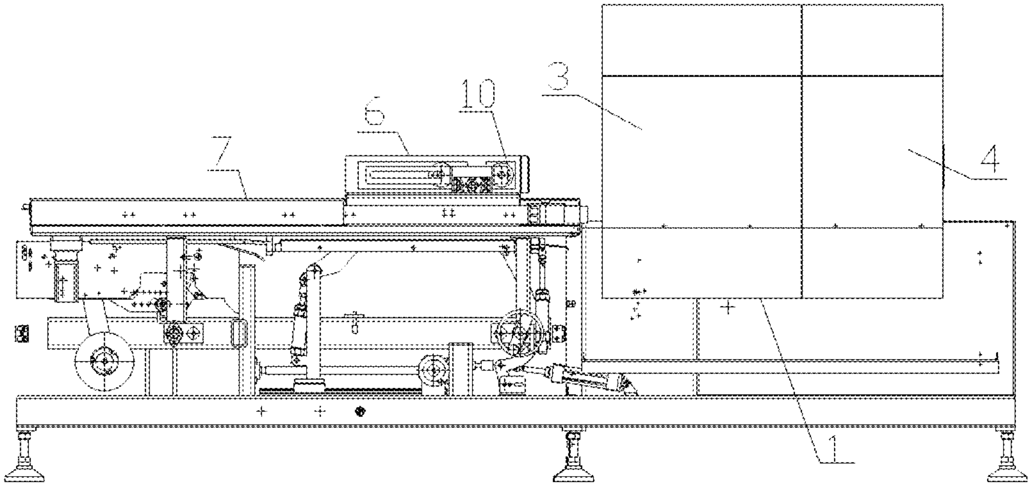
FIG. 3 is a schematic structural rear view illustrating the implementation structure shown in FIG. 1 of this application.
Figure 4:
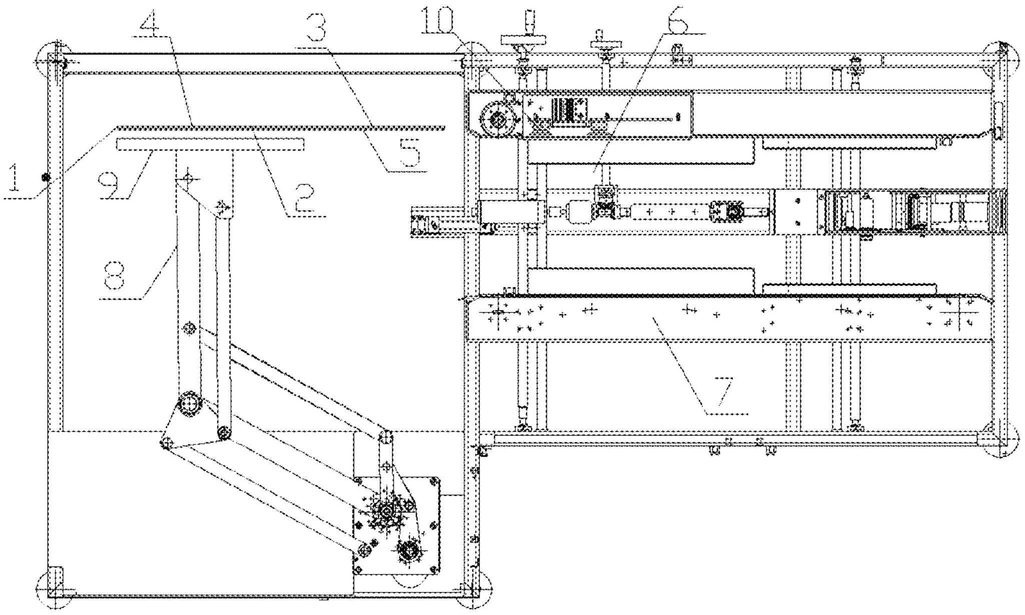
FIG. 4 is a schematic structural top view illustrating the implementation structure shown in FIG. 1 of this application.

The following are example embodiments of this application as described by the claims and their equivalents to assist in a full understanding of this application with reference to the accompanying drawings. The specific details described here are to be regarded as exemplary only and do not limit the scope of this application. Therefore, a person of ordinary skill in the art can make various changes and modifications to the embodiments without departing from the scope and spirit of this application.

Embodiment 1

As a preferred embodiment of this application, references can be made to FIG. 1, FIG. 2, FIG. 3, and FIG. 4 of the specification. This embodiment discloses a carton blank erecting intelligent system. The intelligent system includes a control unit and an actuating unit, and the control unit controls the actuating unit to complete carton blank fetching and erecting actions; the actuating unit includes an actuating mechanism 8, a movable sucker group 9 mounted at a moving end of the actuating mechanism 8, and a fixed sucker group 10 disposed at a carton blank erecting station 6; the control unit controls the actuating mechanism 8 to drive the movable sucker group 9 to move to a carton blank storage station 11 and secure and suck a carton blank 1 in the carton blank storage station 11, and the actuating mechanism 8 drives the movable sucker group 9 to suck carton body I 2 to move the carton blank 1 from the carton blank storage station 11 to the carton blank erecting station 6; the control unit controls the fixed sucker group 10 in the carton blank erecting station 6, sucks carton body II 3 of the carton blank 1 that is moved in place, and secures and keeps carton body II 3 at the carton blank erecting station 6; after carton body II 3 is secured and sucked by the fixed sucker group 10, the actuating mechanism 8 drives carton body I 2 sucked by the movable sucker group 9 to move along a curved trajectory relative to carton body II 3, and after carton body I 2 is moved in place, the carton blank 1 is erected; where carton body I 2 and carton body II 3 are carton bodies on opposite sides of the erected carton blank 1; in a process of driving carton body I 2 to move along the curved trajectory relative to carton body II 3, carton body II 3 is always stationary, and carton body I 2 is always parallel to carton body II 3; and the curved trajectory shows that a projection of carton body I 2 on a first plane gradually moves away from a projection of carton body II 3 on the first plane, and a projection of carton body I 2 on a second plane gradually coincides with a projection of carton body II 3 on the second plane, where the first plane is a plane perpendicular to carton body I 2 and carton body II 3, and the second plane is a plane parallel to carton body I 2 and carton body II 3.

As one example of this embodiment, the control unit can be a host computer, a programmable logic controller (PLC), or another central processing unit that can be used for controlling a packaging machine system. Implementations are not limited in this application.

Embodiment 2

As another preferred embodiment of this application, this embodiment further supplements and describes the technical solutions of this application in detail based on Embodiment 1. In this embodiment, references can be made to FIG. 5 and FIG. 6 of the specification. The control unit adjusts a position of the fixed sucker group 10 relative to the carton blank erecting station 6 based on the size of the carton blank 1, and performs fitting calculation to obtain the curved trajectory followed by the actuating mechanism 8 in driving carton body I 2 sucked by the movable sucker group 9.

As one example of this embodiment, the positions of the fixed sucker group 10 relative to the carton blank erecting station 6 that correspond to sizes of the carton blank 1 are preset in the control unit, and fitting calculation is performed to obtain curved trajectories, corresponding to the sizes of the carton blank 1, followed by the actuating mechanism 8 in driving carton body I 2 sucked by the movable sucker group 9. When the carton blank 1 encounters a size change, a corresponding size can be selected by using the control unit.

As another example of this embodiment, the size of the carton blank 1, that is, the length and the width of the erected carton blank 1 can be input into the control unit. The control unit can calculate the total length (the length+the width) of the folded carton blank 1 based on the input length and width of the carton blank 1, and then adjust the position of the fixed sucker group 10 relative to the carton blank erecting station 6 and a suction position for the actuating mechanism 8 to drive the movable sucker group 9 based on the total length of the folded carton blank 1 to ensure that the fixed sucker group 10 can suck carton body II 3, and the movable sucker group 9 can firmly suck carton body I 2.

If both carton body I 2 and carton body II 3 are long sides of the carton blank 1, when fitting calculation is performed to obtain the curved trajectory followed by the actuating mechanism 8 in driving carton body I 2 sucked by the movable sucker group 9, only the width of the carton blank 1 needs to be considered. The curved trajectory is planned using the width as the radius and two side edges of carton body II 3 as axes.

As described by the above-mentioned examples, the control unit can achieve adaptive adjustment after the size of the carton blank 1 is changed and/or one-click adjustment after the size of the carton blank 1 is changed, and the adjustment is simple.

Figure 5:
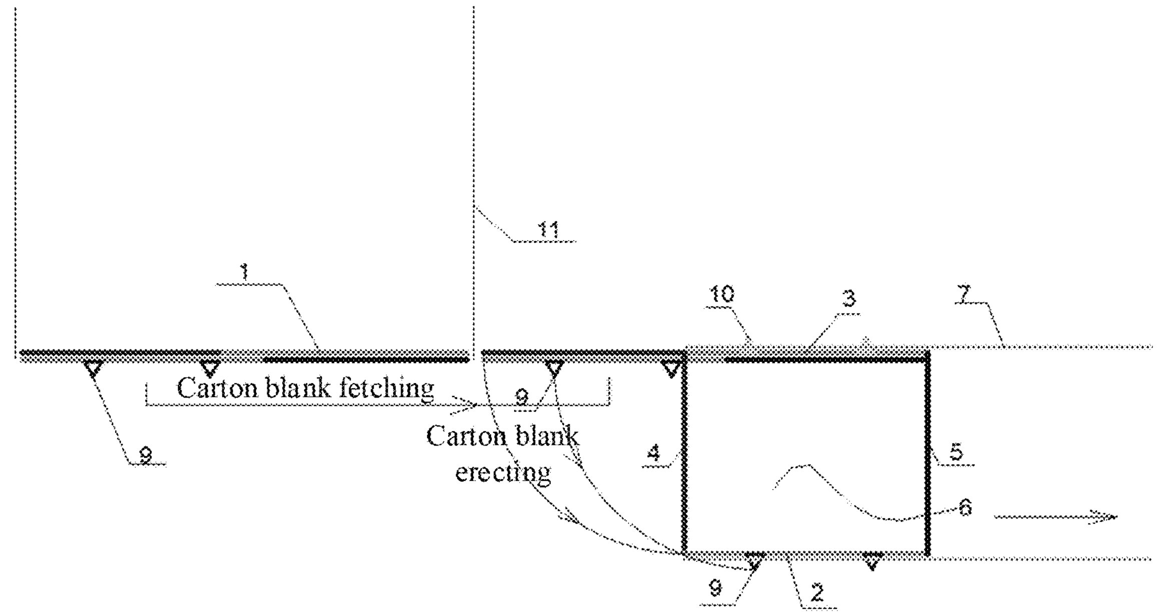
FIG. 5 is a schematic diagram 1 illustrating a carton blank erecting process of a carton blank erecting intelligent system of this application.
Figure 6:
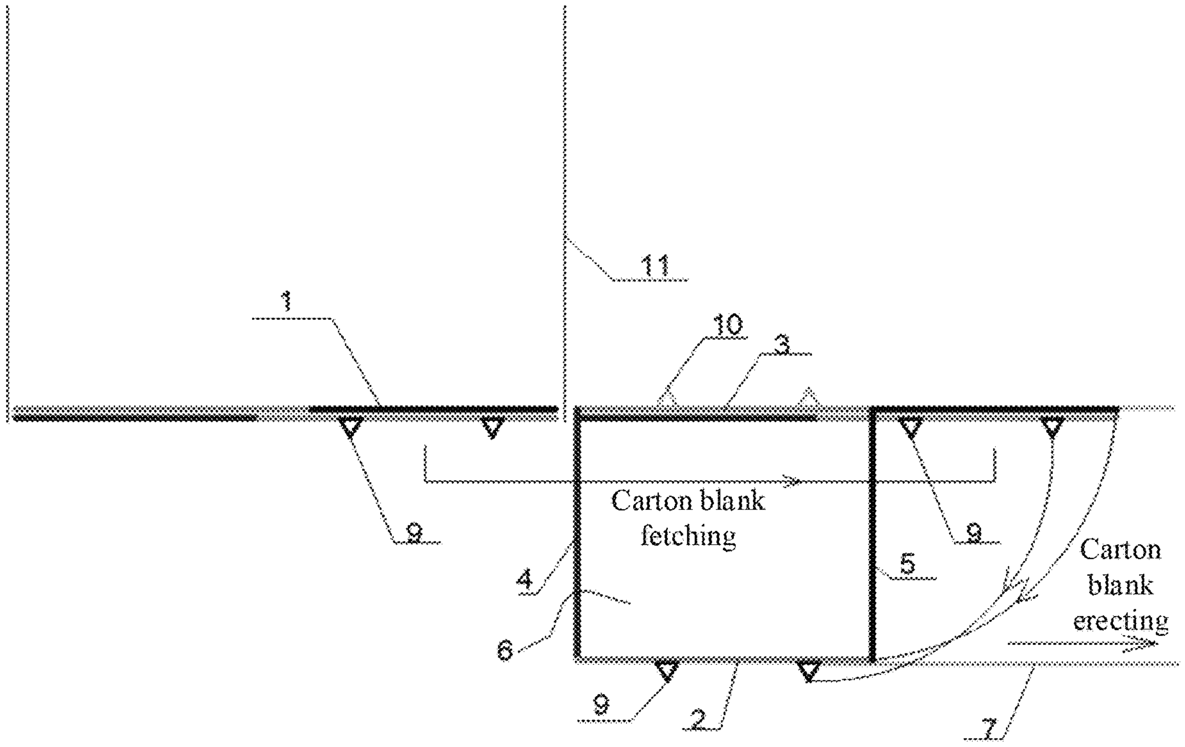
FIG. 6 is a schematic diagram 2 illustrating a carton blank erecting process of a carton blank erecting intelligent system of this application.

As one implementation of this embodiment, references can be made to FIG. 5 and FIG. 6 of the specification. The control unit controls, based on a stacking posture of the carton blank 1, a direction followed by the actuating mechanism 8 in driving carton body I 2 sucked by the movable sucker group 9 to move along the curved trajectory so as to achieve forward erecting or reverse erecting.

References can be made to FIG. 5 of the specification. The forward erecting means the following: with a conveying direction of the erected carton blank 1 as a reference, when carton body II 3 of the carton blank 1 in a folded state is located at a rear end of carton body I 2, the actuating mechanism 8 drives the movable sucker group 9 to drive carton body I 2 to move backward along the curved trajectory.

References can be made to FIG. 6 of the specification. The reverse erecting means the following: with a conveying direction of the erected carton blank 1 as a reference, when carton body II 3 of the carton blank 1 in a folded state is located at a front end of carton body I 2, the actuating mechanism 8 drives the movable sucker group 9 to drive carton body I 2 to move forward along the curved trajectory.

Further, the curved trajectory is a ¼ arc trajectory that uses the length of carton body III 4 or carton body IV 5 adjacent to carton body II 3 as the radius and the center of a joint between carton body II 3 and carton body III 4 or carton body IV 5 adjacent to carton body II 3 as the center of a circle. It is easy to implement the motion trajectory of carton body I 2, thereby further simplifying a control program for controlling operation of carton body I 2, reducing a manufacturing precision requirement on the carton blank 1, and allowing the carton blank 1 to have a specified manufacturing error.

Embodiment 3

As another preferred embodiment of this application, this embodiment further supplements and describes the technical solutions of this application in detail based on Embodiment 1 or Embodiment 2. References can be made to FIG. 1, FIG. 5, and FIG. 6 of the specification. The carton blank erecting station 6 is located at a front end of an erected carton blank conveying path 7, after the carton blank 1 is erected, the control unit controls the movable sucker group 9 and the fixed sucker group 10 to release carton body I 2 and carton body II 3, and the erected carton blank 1 is conveyed backward along the erected carton blank conveying path 7. The center line of the carton blank 1 coincides with the center line of the erected carton blank conveying path 7 after the carton blank 1 is erected. After the carton blank 1 is erected at the carton blank erecting station 6, the control unit controls a carton board folding mechanism to fold carton boards at an opening at one end of the erected carton blank 1 to seal the opening.

In this embodiment, the carton blank erecting station 6 is located at the front end of the erected carton blank conveying path 7, and thus the carton blank 1 can be conveyed to the next procedure immediately after being erected. As such, an implementation structure is compact and actions are coherent, thereby reducing an action interval between erecting of the carton blank and conveying of the carton blank 1, and further effectively improving carton blank erecting and conveying efficiency. In particular, the center line of the carton blank 1 coincides with the center line of the erected carton blank conveying path 7 after the carton blank 1 is erected, thereby ensuring centering of the carton blank 1 after being erected, reducing deflection when conveying the carton blank 1 after the carton blank 1 is erected, and further improving carton blank erecting and conveying efficiency.

Embodiment 4

As another preferred embodiment of this application, this embodiment further supplements and describes the technical solutions of this application in detail based on Embodiment 1, Embodiment 2, or Embodiment 3. In this embodiment, as one implementation of this embodiment, when the actuating mechanism 8 drives the movable sucker group 9 to move the carton blank 1 sucked by the movable sucker group 9 to the position of the fixed sucker group 10, the actuating mechanism 8 can drive the movable sucker group 9 to move towards a direction of the fixed sucker group 10 for a specified distance, that is, enable the carton blank 1 to apply a certain force to the fixed sucker group 10 to ensure that the fixed sucker group 10 can firmly suck carton body II 3 of the carton blank 1.

As another implementation of this embodiment, after the actuating mechanism 8 drives the movable sucker group 9 to suck carton body I 2 to move the carton blank 1 from the carton blank storage station 11 to the carton blank erecting station 6, the control unit controls the fixed sucker group 10 to reach out toward a direction of carton body II 3, and suckers of the fixed sucker group 10 come into contact with carton body II 3 to secure carton body II 3 by vacuum negative-pressure suction; and after the carton blank 1 is erected, the fixed sucker group 10 releases suction on carton body II 3 and then is reset to ensure that the fixed sucker group 10 can firmly suck carton body II 3 of the carton blank 1. After the fixed sucker group 10 sucks carton body II 3, the actuating mechanism 8 actuates to drive carton body I 2 sucked by the movable sucker group 9 to move along the curved trajectory, and the carton blank 1 is erected.

As one example of this embodiment, when a cross section of the erected carton blank 1 is rectangular, carton body I 2 and carton body II 3 are long-side carton bodies of the carton blank 1. A long-side carton body is preferably selected as a reference carton body for erecting the carton blank to ensure stability, high efficiency, and a high success rate in erecting the carton blank.

As one example of this embodiment, the actuating mechanism 8 is a two-axis parallel manipulator or a serial manipulator.

As another example of this embodiment, the actuating mechanism 8 is an XY-axis work module or a cross slide work module.

Motions of carton body I 2 are implemented by one actuating mechanism 8 by driving the movable sucker group 9. The actuating mechanism 8 has a simple implementation structure and low costs, and can effectively ensure coherence between the carton blank fetching and erecting actions. The actuating mechanism 8 can simply be a planar actuating mechanism 8 in two directions, preferably a two-axis manipulator or a serial manipulator. The actuating mechanism 8 has high precision, is easier to implement and simple to control, and enables an apparatus to have a small footprint.

In this embodiment, the fixed sucker group 10 is used to secure carton body II 3, and the implementation structure is simple and easy to implement, can achieve a good securing effect, and can implement a displacement of carton body II 3 in any direction in space, thereby ensuring that carton body II 3 can be effectively secured during erecting of the carton blank 1. When carton body III 4 and/or carton body IV 5 need/needs to be straightened and corrected, the fixed sucker group 10 can coordinate with the movable sucker group 9 that pulls carton body I 2 to stretch and correct carton body III 4 and/or carton body IV 5. The motion trajectory of carton body I 2 can also be varied in response to erecting of the carton blank 1 in different cases.

Embodiment 5

As another preferred embodiment of this application, this embodiment further supplements and describes the technical solutions of this application in detail based on Embodiment 1, Embodiment 2, Embodiment 3, or Embodiment 4. In this embodiment, references can be made to FIG. 5 and FIG. 6 of the specification. When an arrangement direction at the carton blank storage station 11 is perpendicular to the erected carton blank conveying path 7, the actuating mechanism 8 drives the movable sucker group 9 to move to the front end of the carton blank storage station 11 to suck a carton blank 1 located at the frontmost end of the carton blank storage station 11, specifically, to suck carton body I 2 of the carton blank 1 (if a cross section of the erected carton blank 1 is rectangular, carton body I 2 is preferably a long-side carton body of the carton blank 1; a short-side carton body of the carton blank 1 can be optionally sucked; in comparison, both the erecting effect and erecting success rate in the case of sucking the long-side carton body are higher).

The actuating mechanism 8 drives the movable suckers to convey the carton blank 1 sucked by the movable suckers backward along the erected carton blank conveying path 7 for a certain distance until carton body II 3 on the other side can be sucked by the fixed sucker group 10.

In specific implementation, if the structure allows, carton body I 2 sucked by the movable sucker group 9 shown in FIG. 5 can partially overlap a repository for the carton blank 1, provided that carton body II 3 on the opposite side of carton body I 2 sucked by the movable sucker group 9 can be sucked by the fixed sucker group 10, so as to minimize a moving distance of the carton blank 1 relative to the fixed sucker group 10 to improve the erecting efficiency of the carton blank 1.

When the actuating mechanism 8 drives the movable sucker group 9 to move the carton blank 1 sucked by the movable sucker group 9 to the position of the fixed sucker group 10, the actuating mechanism 8 can drive the movable sucker group 9 to move towards the direction of the fixed sucker group 10 for a specified distance, that is, enable the carton blank 1 to apply a certain force to the fixed sucker group 10 to ensure that the fixed sucker group 10 can firmly suck carton body II 3 of the carton blank 1; or the fixed sucker group 10 reaches out towards the direction of carton body II 3 for a specified length (which is held at the position after suction or reset after suction) to ensure that the fixed sucker group 10 can firmly suck carton body II 3 of the carton blank 1. After the fixed sucker group 10 sucks carton body II 3, the actuating mechanism 8 actuates to drive carton body I 2 sucked by the movable sucker group 9 to move along the curved trajectory, and the carton blank 1 is erected.

As another implementation of this embodiment, when an arrangement direction of the carton blank storage station 11 is parallel to the erected carton blank conveying path 7, the actuating mechanism 8 drives the movable sucker group 9 to move to the front end of the carton blank storage station 11 to suck a carton blank 1 located at the frontmost end of the carton blank storage station 11, specifically, to suck carton body I 2 of the carton blank 1; and then the actuating mechanism 8 drives the movable suckers to actuate to make the carton blank 1 turn over by 90° until carton body II 3 on the other side can be sucked by the fixed sucker group 10. Other actions are similar to the actions illustrated in the first implementation of this embodiment.

Embodiment 6

As another preferred embodiment of this application, this embodiment further supplements and describes the technical solutions of this application in detail based on Embodiment 1, Embodiment 2, Embodiment 3, Embodiment 4, or Embodiment 5.

As one implementation of this embodiment, the carton blank erecting method illustrated in this application is applied to a vertical cartoner. FIG. 5 and FIG. 6 are top views illustrating the intelligent system of this application that is applied to the vertical erector; a structure shown in FIG. 1, FIG. 2, FIG. 3, and FIG. 4 is applied to the vertical erector, so that the effective erecting rate of the vertical erector is improved, the erecting effect of the carton blank 1 is good, material requirements on the carton blank 1 are low, and costs of vertical erecting apparatuses are low.

As another implementation of this embodiment, the carton blank erecting method disclosed in this application is applied to a horizontal erector. FIG. 5 and FIG. 6 are front views illustrating the intelligent system of this application that is applied to the horizontal erector; a structural layout shown in FIG. 5 is similar to the structure of an existing horizontal packaging machine, except that a two-axis parallel manipulator or a serial manipulator is used for carton blank fetching and erecting, and the fixed sucker group 10 is disposed above the erected carton blank conveying path 7. Compared with an existing horizontal erector, applications of this application are beneficial to simplifying the structure of the horizontal erector, reducing apparatus costs, and improving erecting efficiency.

In the layout shown in FIG. 6, the carton blank storage station 11 for horizontal stacking in the existing horizontal erector can be changed for horizontally placing carton blanks 1 up-right. Then, after the carton blank 1 is fetched, the carton blank 1 is rotated by 90°, so that the carton blank 1 is horizontal. After the carton blank 1 is moved horizontally in place, the fixed sucker group 10 sucks carton body II 3, and carton body I 2 moves downward along the curved trajectory to erect the carton blank 1.

This application is applicable to both forward erecting and reverse erecting regardless of whether this application is applied to a vertical erector or a horizontal erector, and switching between forward erecting and reverse erecting is simple.

Embodiment 7

Figure 7:
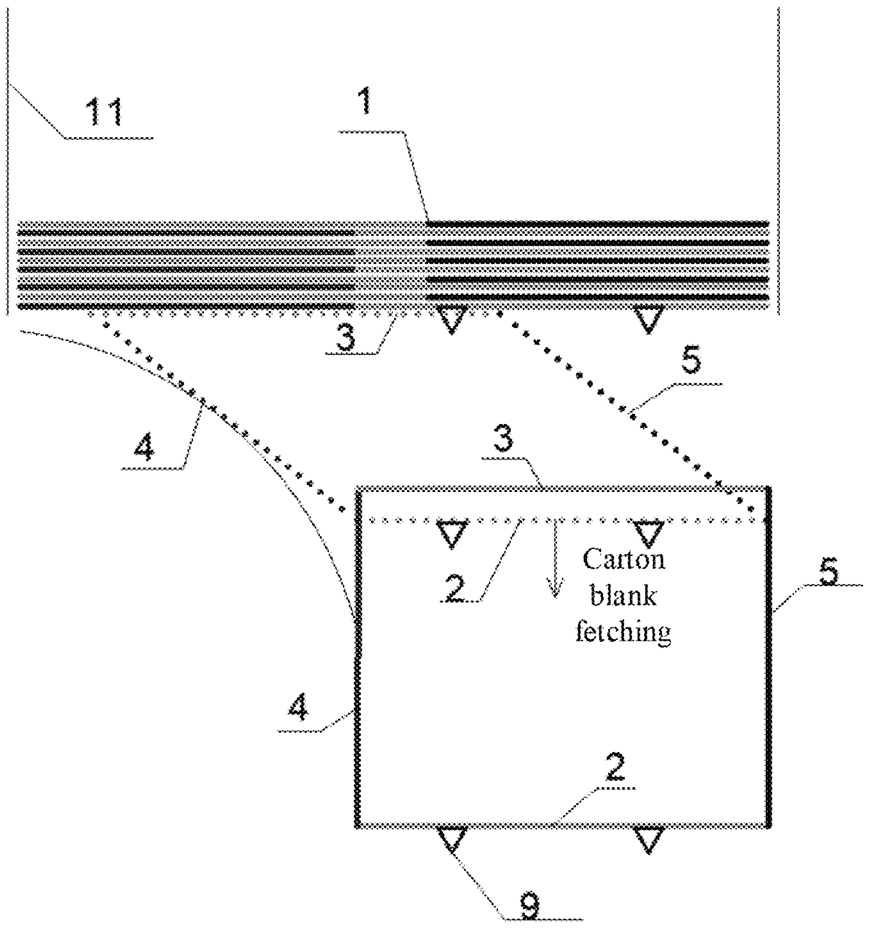
FIG. 7 is a schematic diagram illustrating a carton blank erecting process of the first carton blank erecting system in the background of this application.
Figure 8:
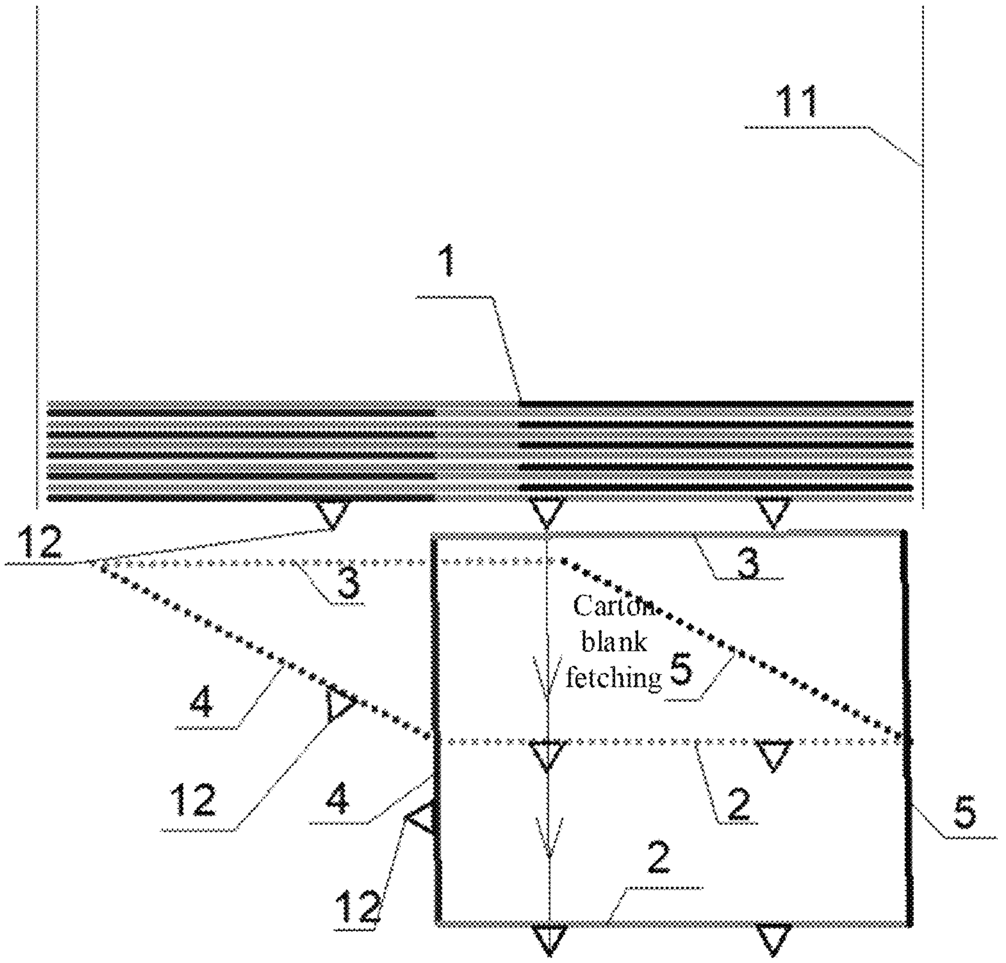
FIG. 8 is a schematic diagram illustrating a carton blank erecting process of the second carton blank erecting system in the background of this application.

As one comparative embodiment of this application, references can be made to FIG. 7 and FIG. 8. This embodiment is an implementation of the existing technologies. A carton blank erecting system shown in FIG. 7 is as follows: an actuating mechanism 8 drives a movable sucker group 9 to suck carton body I 2 of a carton blank 1 to fetch the carbon blank 1. In the process of fetching the carbon blank 1, an auxiliary forming strip is used to press against carton body III 4, so that carton body III 4 rotates by 90° about a joint between carton body III 4 and carton body I 2, and the carton blank 1 is erected. In this approach, an erecting action of the carton blank 1 is completed in the process of fetching the carton blank 1, and erecting of the carton blank 1 is also completed after the carton blank 1 is fetched and moved in place.

A carton blank erecting system shown in FIG. 8 is as follows: an actuating mechanism 8 drives a movable sucker group 9 and a turnover-plate sucker group 12 to suck carton body I 2 and carton body III 4 of a carton blank 1 respectively to fetch the carbon blank 1. In the process of fetching the carbon blank 1, the turnover-plate sucker group 12 that sucks carton body III 4 rotates by 90° relative to the movable sucker group 9 that sucks carton body I 2, helping carton body III 4 rotate by 90° about a joint between carton body III 4 and carton body I 2, and the carton blank 1 is erected. This approach is the same as the approach shown in FIG. 7, that is, an erecting action of the carton blank 1 is completed in the process of fetching the carton blank 1, and erecting of the carton blank 1 is also completed after the carton blank 1 is fetched and moved in place.

The system principles shown in FIG. 7 and FIG. 8 both achieve the erection of the carton blank 1 by rotating carton body III 4 by 90° relative to carton body I 2. During the erection of the carton blank 1, carton body II 3 and carton body IV 5 of the carton blank 1 have no support, and carton body II 3 and carton body IV 5 rotate along with the turnover of carton body III 4. As a result, carton body II 3 and carton body IV 5 are under great stress, and thus pose high requirements on the hardness of the carton blank 1. When the hardness of the carton blank 1 is low, carton body II 3 and carton body IV 5 are extremely prone to being stressed and deformed, resulting in a poor carton blank erecting effect, a low effective erecting success rate, and low erecting efficiency.

The principle for erecting the carton blank 1 in this application is as follows: a carton blank 1 to be erected is fetched and moved in a way that carton body I 2 is secured and sucked; the carton blank 1 with carton body I 2 secured and sucked is moved to a carton blank erecting station 6, and carton body II 3 of the carton blank 1 moved in place is secured at the carton blank erecting station 6; after carton body II 3 of the carton blank 1 is secured, secured and sucked carton body I 2 is driven to move along a curved trajectory relative to carton body II 3, and after carton body I 2 is moved in place, the carton blank 1 is erected; carton body I 2 and carton body II 3 are carton bodies on opposite sides of the erected carton blank 1; in a process of driving carton body I 2 to move along the curved trajectory relative to carton body II 3, carton body II 3 is always stationary, and carton body I 2 is always parallel to carton body II 3; and the curved trajectory shows that a projection of carton body I 2 on a first plane gradually moves away from a projection of carton body II 3 on the first plane, and a projection of carton body I 2 on a second plane gradually coincides with a projection of carton body II 3 on the second plane, where the first plane is a plane perpendicular to carton body I 2 and carton body II 3, and the second plane is a plane parallel to carton body I 2 and carton body II 3.

The carton blank erecting intelligent system of this application implements erecting of the carton blank 1 through staggered separation between carton body I 2 and carton body II 3. During the erecting, carton body III 4 and carton body IV 5 are not subject to a press force, and thus are not deformed. If carton body III 4 and carton body IV 5 of the carton blank 1 are originally deformed, carton body III 4 and carton body IV 5 can also be straightened through staggered separation between carton body I 2 and carton body II 3 to correct the deformation. Compared with the principles for erecting carton blanks shown in FIG. 7 and FIG. 8, the carton blank erecting intelligent system of this application has a low requirement on the hardness of the carton blank 1, and can be applied to carton blanks 1 with different hardness and made of different materials, and an effective erecting success rate can be effectively ensured.

Embodiment 8

Figure 9:
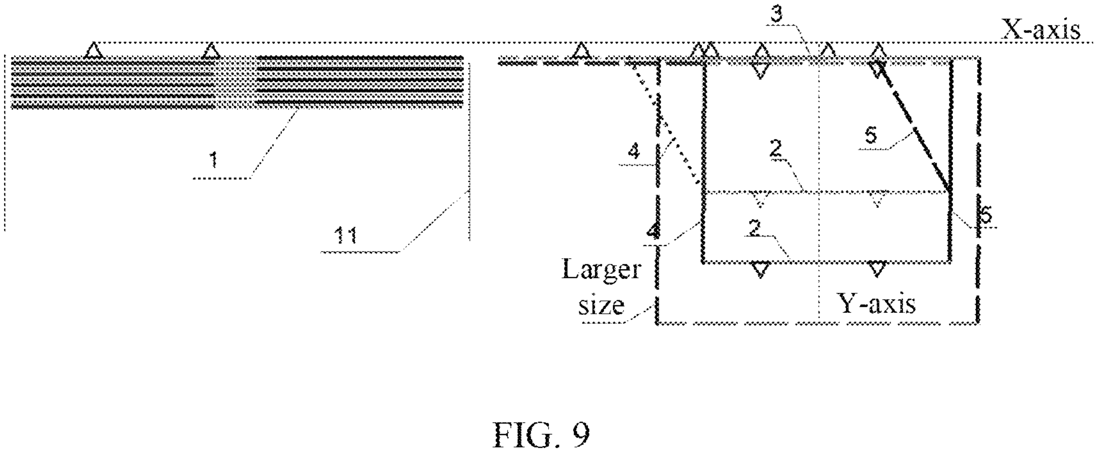
FIG. 9 is a schematic diagram illustrating a carton blank erecting process of the third carton blank erecting system in the background of this application.

As another comparative embodiment of this application, references can be made to FIG. 9 of the specification. The principle for erecting carton blanks illustrated in FIG. 9 is as follows: one actuating mechanism 8 sucks carton body II 3 of a carton blank 1 to fetch the carbon blank 1, after the fetched carbon blank 1 is moved in place, carton body I 2 of the carton blank 1 is sucked, carton body I 2 of the carton blank 1 is moved in a direction perpendicular to carton body II 3, and carton body II 3 of the carton blank 1 is moved in a direction parallel to carton body II 3 of the carton blank 1 at the same time; a displacement of carton body I 2 is described as the X axis, and a displacement of carton body II 3 is described as the Y axis; and after both carton body II 3 and carton body I 2 are moved in place, the carton blank 1 is erected. At least two motion mechanisms are needed, one drives carton body I 2 to move along the X axis, and the other drives carton body II 3 to move along the Y axis; the displacements of carton body I 2 and carton body II 3 are the same, and both are the length of carton body III 4 and/or carton body IV 5. The motions of carton body I 2 and carton body II 3 need to take not only the length of carton body III 4 and/or carton body IV 5 but also the length of carton body I 2 and carton body II 3 into account, thereby implementing control on an X-axis displacement rate and a Y-axis displacement rate, and ensuring position precision of the X-axis motion mechanism in sucking carton body I 2 and position precision of the Y-axis motion mechanism in sucking carton body II 3. Otherwise, the erected carton blank 1 will be deformed.

However, in an actual implementation process, there will be a certain error among carton blanks 1 with the same size and specifications, so it is difficult to ensure precise securing positions for the X-axis motion mechanism and the Y-axis actuating mechanism, and there is no way to ensure the erecting effect of the carton blanks 1.

Similarly, based on different positions of the X-axis motion mechanism and the Y-axis actuating mechanism for securing carton bodies, action coordination between the X-axis motion mechanism and the Y-axis motion mechanism cannot be established, and can be determined only when the positions of the two actuating mechanisms for securing the carton bodies relative to each other are precise, and the action coordination between the two actuating mechanisms cannot be adaptively adjusted. Therefore, this method has high requirements on both motion precision of the actuating mechanism 8 and machining precision of the carton blanks 1. Coordination between the X-axis motion mechanism and the Y-axis motion mechanism is difficult to achieve, and its implementation structure is difficult to control.

In a specific implementation process of the principle for erecting a carton blank as shown in FIG. 9, the X-axis motion mechanism and the Y-axis motion mechanism instead of the carton blank 1 are used as the reference, that is, carton blanks 1 of different sizes are erected with one of the axes as the reference, and a position of the center line of the erected carton blanks 1 has changed regardless of the X-axis or the Y-axis. In addition, for the carton blanks 1 of different sizes, front-end positions and rear-end positions of the erected carton blanks 1 have changed, and the center lines of the erected carton blanks 1 have also changed, which is not conducive to adjustment of a carton board folding mechanism, and is also not conducive to adaptation to a conveying mechanism for the erected carton blanks 1. After the size is changed, both the carton board folding mechanism and the conveying mechanism for the erected carton blanks 1 experience significant adjustments.

Moreover, due to difficulty in coordination between the X-axis motion mechanism and the Y-axis motion mechanism, after the size of the carton blanks 1 is changed, a large amount of time is needed to debug the X-axis motion mechanism and the Y-axis motion mechanism, so that the carton blanks 1 with the size changed can be better erected.

Figure 11:
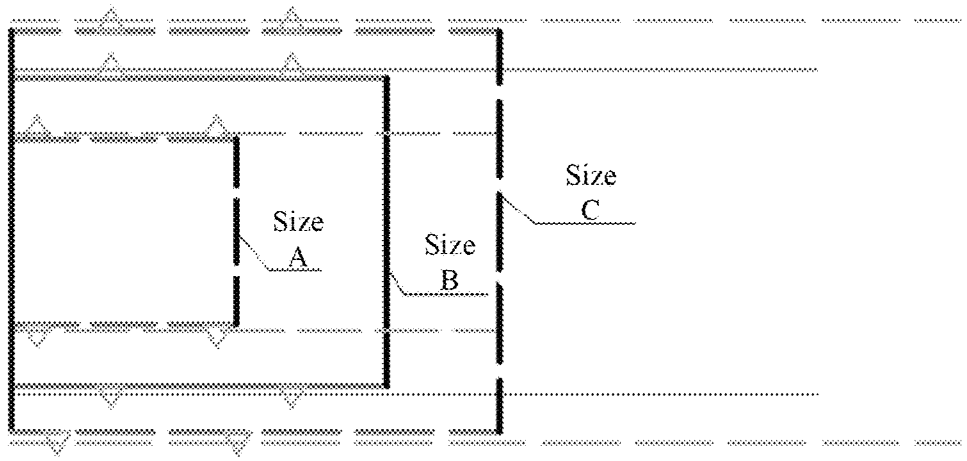
FIG. 11 is a schematic diagram illustrating erecting of carton blanks of different sizes in a carton blank erecting method of this application; and Reference numerals: 1. carton blank, 2. carton body I, 3. carton body II, 4. carton body III, 5. carton body IV, 6. carton blank erecting station, 7. erected carton blank conveying path, 8. actuating mechanism, 9. movable sucker group, 10. fixed sucker group, 11. carton blank storage station, and 12. turnover-plate sucker group.

Compared with the carton blank erecting approach shown in FIG. 9, this application has the following advantages: this application can be implemented by using one actuating mechanism 8, thereby reducing costs of implementation apparatuses; in this application, only actions of carton body I 2 need to be controlled, featuring easier implementation and control; in this application, both carton blank fetching and erecting are implemented through carton body I 2, there is no requirement on a position for securing and sucking carton body I 2, as long as carton body I 2 can be secured and sucked; and the reference in this application is always the center line of the erected carton blank 1 (references can be made to FIG. 11 of the specification), only centering adjustment is needed, and adjustment after the size of the carton blank 1 is changed is simpler. A motion reference of carton body I 2 is always carton body II 3, that is, joints between two ends of carton body II 3 and carton body II 14 and carton body IV 5, and the motion reference remains unchanged. When carton body I 2 moves relative to carton body II 3, carton body II 3 is always kept stationary, so the motion reference of carton body II 3 is also unchanged. Carton body I 2 makes a curvilinear motion by always using the joints between the two ends of carton body II 3 and carton body III 4 and carton body IV 5 as the centers of circles, and there is no requirement on a position of the actuating mechanism 8 for sucking carton body I 2. Therefore, the implementation of the actuating mechanism 8 is simpler, and a precision requirement on a sucking position of the actuating mechanism 8 is not high, provided that firm suction can be achieved. When a motion trajectory of carton body I 2 is fitted, only the length of carton body III 4 and carton body IV 5 needs to be considered, and the position for securing and sucking carton body I 2 does not need to be considered additionally.

In addition, in this application, carton body I 2 moves, the motion trajectory is simple, and an action speed of carton body I 2 can be higher, thereby improving carton blank erecting efficiency.

Embodiment 9

Figure 10:
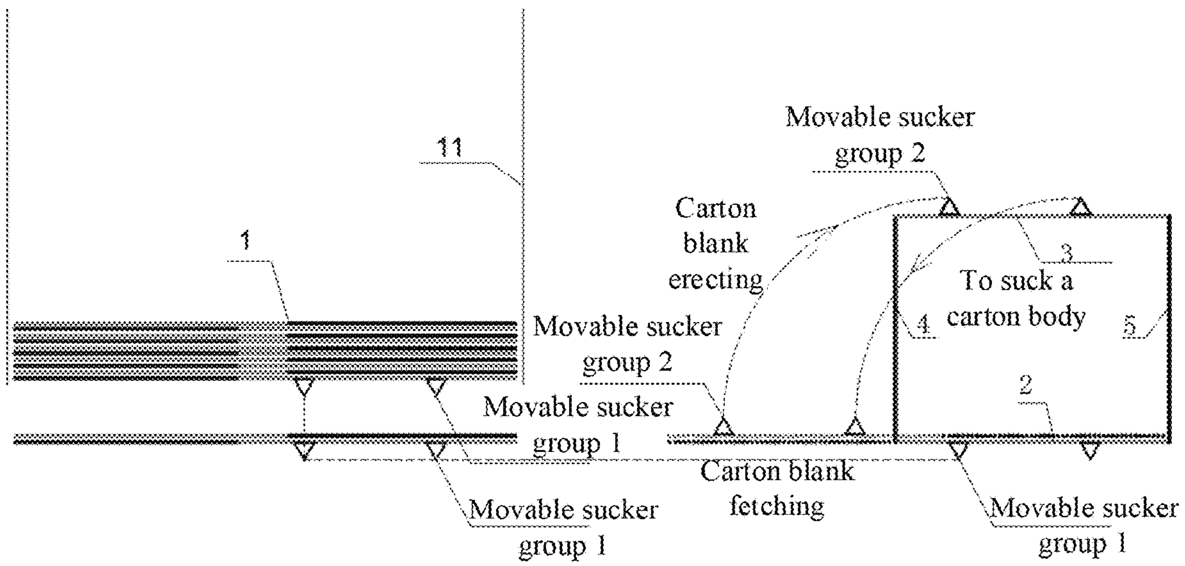
FIG. 10 is a schematic diagram illustrating a carton blank erecting process of the fourth carton blank erecting system in the background of this application.

As another comparative embodiment of this application, references can be made to FIG. 10 of the specification. The principle for erecting a carton blank shown in FIG. 10 is as follows: one motion mechanism for carton blank fetching is used to suck carton body I 2 of a carton blank 1 to fetch the carbon blank 1, and after the fetched carbon blank 1 is moved in place, carton body I 2 of the carton blank 1 is relatively secured; and one motion mechanism for carton blank erecting is used to suck carton body II 3, and drive carton body II 3 to move in a curve-fitting way in a direction perpendicular to carton body I 2 and a direction parallel to carton body I 2, and the carton blank 1 is erected after carton body II 3 is moved in place.

References can be made to FIG. 10 of the specification. In the principle for erecting a carton blank as illustrated, at least two motion mechanisms are necessarily needed for implementation, that is, one motion mechanism is needed to perform the action of "sucking carton body I 2 of the carton blank 1 to fetch the carbon blank 1 and moving the carton blank 1 in place", and a second motion mechanism is needed to perform the action of "sucking carton body II 3 and driving carton body II 3 to move relative to carton body I 2 to erect the carton blank 1". From the perspective of an implementation structure, costs for implementing the approach shown in FIG. 10 are high.

In terms of implementation actions, in the approach shown in FIG. 10, the second motion mechanism sucks carton body II 3 only after carton body II 3 is moved in place, and then drives carton body II 3 to move. Generally, when a motion mechanism is configured, the motion mechanism is provided with an initial position, that is, after carton body II 3 is moved in place, the second motion mechanism needs to move from the initial position to carton body II 3 to suck carton body II 3. When the approach shown in FIG. 10 is implemented, when carton body II 3 is moved in place, it needs to wait for the second actuating mechanism 8 to move to carton body II 3 to suck carton body II 3, and as a result, there is a time interval, between the action of fetching the carbon blank and moving the carbon blank in place and the carbon blank erecting action, for waiting for the second actuating mechanism 8 to move in place.

In this application, a carton body used for carton blank fetching and erecting operations is carton body I 2. When a carton blank 1 is moved in place, carton body II 3 will be sucked, and carton body I 2 can immediately start an erecting action. An action interval between the carton blank fetching action and erecting action is almost negligible, which greatly saves time, enhances coherence of actions, reduces costs of an implementation structure, and improves erecting efficiency.

Although the concept of this application has been illustrated and described in detail with reference to example embodiments of this application, it should be understood by a person skilled in the art that various changes in forms and details can be made to this application without departing from the spirit and scope of this application as described in the claims.

What is claimed is:

1. A carton blank erecting intelligent system, wherein:

the carton blank erecting intelligent system comprises a control device and an actuating device, and the control device is configured to control the actuating device to complete carton blank fetching and erecting actions;

the actuating device comprises an actuating mechanism, a movable sucker group mounted at a moving end of the actuating mechanism, and a fixed sucker group disposed at a carton blank erecting station;

the control device is configured to control the actuating mechanism to drive the movable sucker group to:

move to a carton blank storage station; and secure and suck a carton blank in the carton blank storage station, and the actuating mechanism is configured to drive the movable sucker group to suck a carton body I to move the carton blank from the carton blank storage station to the carton blank erecting station;

the control device is configured to control the fixed sucker group in the carton blank erecting station to:

suck a carton body II of the carton blank that is moved to the carton blank erecting station; and secure and keep the carton body II at the carton blank erecting station;

after the carton body II is secured and sucked by the fixed sucker group, the actuating mechanism is configured to drive the carton body I sucked by the movable sucker group to move along a curved trajectory relative to the carton body II, wherein after the carton body I is moved to a predetermined position, the carton blank is erected; and the control device is configured to:

adjust a position of the fixed sucker group relative to the carton blank erecting station based on a size of the carton blank; and perform fitting calculation to obtain the curved trajectory followed by the actuating mechanism in driving the carton body I sucked by the movable sucker group.

2. The carton blank erecting intelligent system according to claim 1, wherein the control device is configured to control, based on a stacking posture of the carton blank, a direction followed by the actuating mechanism in driving the carton body I sucked by the movable sucker group to move along the curved trajectory to achieve forward erecting or reverse erecting.

3. The carton blank erecting intelligent system according to claim 2, wherein the forward erecting comprises the following:

with a conveying direction of the erected carton blank as a reference, when the carton body II of the carton blank in a folded state is located at a rear end of the carton body I, the actuating mechanism is configured to drive the movable sucker group to drive the carton body I to move backward along the curved trajectory.

4. The carton blank erecting intelligent system according to claim 2, wherein the reverse erecting comprises the following:

with a conveying direction of the erected carton blank as a reference, when the carton body II of the carton blank in a folded state is located at a front end of the carton body I, the actuating mechanism is configured to drive the movable sucker group to drive the carton body I to move forward along the curved trajectory.

5. The carton blank erecting intelligent system according to claim 1, wherein the curved trajectory is a ¼ arc trajectory, and wherein the ¼ arc trajectory has a radius having a length equal toa length of carton body III or a length of carton body IV adjacent to the carton body II, and the ¼ arc trajectory has a center of a circle as a center of a joint between the carton body II and the carton body III or the carton body IV adjacent to the carton body II.

6. The carton blank erecting intelligent system according to claim 1, wherein:

the carton blank erecting station is located at a front end of an erected carton blank conveying path; and after the carton blank is erected, the control device is configured to control the movable sucker group and the fixed sucker group to release the carton body I and the carton body II, wherein the erected carton blank is conveyed backward along the erected carton blank conveying path.

7. The carton blank erecting intelligent system according to claim 6, wherein the center line of the carton blank coincides with the center line of the erected carton blank conveying path after the carton blank is erected.

8. The carton blank erecting intelligent system according to claim 1, wherein after the carton blank is erected at the carton blank erecting station, the control device is configured to control a carton board folding mechanism to fold one or more carton boards at an opening at one end of the erected carton blank to seal the opening.

9. The carton blank erecting intelligent system according to claim 1, wherein after the actuating mechanism drives the movable sucker group to suck the carton body I to move the carton blank from the carton blank storage station to the carton blank erecting station, the control device is configured to:

control the fixed sucker group to reach out towards a direction of the carton body II, and cause the suckers of the fixed sucker group to come into contact with the carton body II to secure the carton body II by vacuum negative-pressure suction; and after the carton blank is erected, control the fixed sucker group to release suction on the carton body II and reset the fixed sucker group.

10. The carton blank erecting intelligent system according to claim 1, wherein when a cross section of the erected carton blank is rectangular, the carton body I and the carton body II are long-side carton bodies of the carton blank.

11. The carton blank erecting intelligent system according to claim 1, wherein the actuating mechanism is a two-axis parallel manipulator or a serial manipulator.

12. The carton blank erecting intelligent system according to claim 1, wherein the actuating mechanism is an XY-axis work module or a cross slide work module.

13. The carton blank erecting intelligent system according to claim 1, wherein:

the carton body I and the carton body II are positioned on opposite sides of the erected carton blank;

in the process of driving the carton body I to move along the curved trajectory relative to the carton body II, the carton body II remains stationary, and the carton body I is parallel to the carton body II; and the curved trajectory is configured such that a projection of the carton body I on a first plane gradually moves away from a projection of the carton body II on the first plane, and that a projection of the carton body I on a second plane gradually coincides with a projection of the carton body II on the second plane, wherein the first plane is perpendicular to the carton body I and the carton body II, and the second plane is parallel to the carton body I and the carton body II.

14. A carton blank erecting intelligent system, wherein:

the carton blank erecting intelligent system comprises a control device and an actuating device, and the control device is configured to control the actuating device to complete carton blank fetching and erecting actions;

the actuating device comprises an actuating mechanism, a movable sucker group mounted at a moving end of the actuating mechanism, and a fixed sucker group disposed at a carton blank erecting station;

the control device is configured to control the actuating mechanism to drive the movable sucker group to:

move to a carton blank storage station; and secure and suck a carton blank in the carton blank storage station, and the actuating mechanism is configured to drive the movable sucker group to suck a carton body I to move the carton blank from the carton blank storage station to the carton blank erecting station;

the control device is configured to control the fixed sucker group in the carton blank erecting station to:

suck a carton body II of the carton blank that is moved to the carton blank erecting station; and secure and keep the carton body II at the carton blank erecting station;

after the carton body II is secured and sucked by the fixed sucker group, the actuating mechanism is configured to drive the carton body I sucked by the movable sucker group to move along a curved trajectory relative to the carton body II, wherein after the carton body I is moved to a predetermined position, the carton blank is erected; and the control device is configured to control, based on a stacking posture of the carton blank, a direction followed by the actuating mechanism in driving the carton body I sucked by the movable sucker group to move along the curved trajectory to achieve forward erecting or reverse erecting.

15. The carton blank erecting intelligent system according to claim 14, wherein:

the carton body I and the carton body II are positioned on opposite sides of the erected carton blank;

in the process of driving the carton body I to move along the curved trajectory relative to the carton body II, the carton body II remains stationary, and the carton body I is parallel to the carton body II; and the curved trajectory is configured such that a projection of the carton body I on a first plane gradually moves away from a projection of the carton body II on the first plane, and that a projection of the carton body I on a second plane gradually coincides with a projection of the carton body II on the second plane, wherein the first plane is perpendicular to the carton body I and the carton body II, and the second plane is parallel to the carton body I and the carton body II.

16. The carton blank erecting intelligent system according to claim 14, wherein the control device is configured to:

adjust a position of the fixed sucker group relative to the carton blank erecting station based on a size of the carton blank; and perform fitting calculation to obtain the curved trajectory followed by the actuating mechanism in driving the carton body I sucked by the movable sucker group.

17. The carton blank erecting intelligent system according to claim 14, wherein the forward erecting comprises the following:

with a conveying direction of the erected carton blank as a reference, when the carton body II of the carton blank in a folded state is located at a rear end of the carton body I, the actuating mechanism is configured to drive the movable sucker group to drive the carton body I to move backward along the curved trajectory.

18. The carton blank erecting intelligent system according to claim 14, wherein the reverse erecting comprises the following:

with a conveying direction of the erected carton blank as a reference, when the carton body II of the carton blank in a folded state is located at a front end of the carton body I, the actuating mechanism is configured to drive the movable sucker group to drive the carton body I to move forward along the curved trajectory.

19. A method performed by a carton blank erecting intelligent system, wherein the carton blank erecting intelligent system comprises a control device and an actuating device, and the control device is configured to control the actuating device to complete carton blank fetching and erecting actions, wherein the actuating device comprises an actuating mechanism, a movable sucker group mounted at a moving end of the actuating mechanism, and a fixed sucker group disposed at a carton blank erecting station, and wherein the method comprises:

controlling, by the control device, the actuating mechanism to drive the movable sucker group to:

move to a carton blank storage station; and secure and suck a carton blank in the carton blank storage station;

driving, by the actuating mechanism, the movable sucker group to suck a carton body I to move the carton blank from the carton blank storage station to the carton blank erecting station;

controlling, by the control device, the fixed sucker group in the carton blank erecting station to:

suck a carton body II of the carton blank that is moved to the carton blank erecting station; and secure and keep the carton body II at the carton blank erecting station;

adjusting, with the control device, a position of the fixed sucker group relative to the carton blank erecting station based on a size of the carton blank;

performing, with the control device, fitting calculation to obtain a curved trajectory of the movable sucker group relative to the carton body II followed by the actuating mechanism in driving the carton body I sucked by the movable sucker group; and after the carton body II is secured and sucked by the fixed sucker group, driving, by the actuating mechanism, the carton body I sucked by the movable sucker group to move along the curved trajectory relative to the carton body II, wherein after the carton body I is moved to a predetermined position, the carton blank is erected.

20. A method performed by a carton blank erecting intelligent system, wherein the carton blank erecting intelligent system comprises a control device and an actuating device, and the control device is configured to control the actuating device to complete carton blank fetching and erecting actions, wherein the actuating device comprises an actuating mechanism, a movable sucker group mounted at a moving end of the actuating mechanism, and a fixed sucker group disposed at a carton blank erecting station, and wherein the method comprises:

controlling, by the control device, the actuating mechanism to drive the movable sucker group to:

move to a carton blank storage station; and secure and suck a carton blank in the carton blank storage station;

driving, by the actuating mechanism, the movable sucker group to suck a carton body I to move the carton blank from the carton blank storage station to the carton blank erecting station;

controlling, by the control device, the fixed sucker group in the carton blank erecting station to:

suck a carton body II of the carton blank that is moved to the carton blank erecting station; and secure and keep the carton body II at the carton blank erecting station;

after the carton body II is secured and sucked by the fixed sucker group, driving, by the actuating mechanism, the carton body I sucked by the movable sucker group to move along a curved trajectory relative to the carton body II, wherein after the carton body I is moved to a predetermined position, the carton blank is erected; and controlling, with the control device, based on a stacking posture of the carton blank, a direction followed by the actuating mechanism in driving the carton body I sucked by the movable sucker group to move along the curved trajectory to achieve forward erecting or reverse erecting.

* * * * *